Patented Oct. 8, 1946

2,408,823

UNITED STATES PATENT OFFICE 2,408,823

MANUFACTURE OF SULPHAMIC ACID

Ernest J. Tauch, Cleveland Heights, Ohio, assignor to E. I. du Pont de Nemours & Company, Wilmington, Del., a corporation of Delaware No Drawing. Application July 21, 1944, Serial No. 546,065

15 Claims. (Cl. 23—166)

This invention relates to the manufacture of sulphamic acid and is particularly directed to processes for producing sulphamic acid from urea, sulphuric acid and sulphur trioxide.

It is known that sulphamic acid may be obtained by the interaction of sulphuric acid, sulphur trioxide, and urea. See Baumgarten 2,102,350, Ber. 69B 1929–37. The reaction is strongly exothermic and unless carefully carried out may proceed with violence. The various methods heretofore available for controlling the reaction have not been entirely satisfactory either because of the difficulty of recovering the product from the reaction mixture or because of difficulty of obtaining satisfactory cooling during the reaction.

The invention has for its objects to provide new and improved processes for the manufacture of sulphamic acid; to provide simple and effective means for dissipating the heat of reaction of urea, sulphuric acid and sulphur trioxide; to provide safe and efficient processes of reacting equimolecular proportions of urea and sulphuric acid with sulphur trioxide; to obtain improved yields of sulphamic acid; to obtain improved quality of sulphamic acid; to reduce the cost of manufacture of sulphamic acid; to reduce operating hazards in the manufacture of sulphamic acid; to avoid the disadvantages of the prior art, and to obtain advantages as will appear hereinafter. Further objects will become apparent as the description proceeds.

These objects are accomplished in the present invention by the processes more particularly to be set out.

According to the invention sulphamic acid is produced from urea, sulphuric acid, and sulphur trioxide simply and effectively by reacting the urea, sulphuric acid and sulphur trioxide in a liquid vehicle consisting predominantly of liquid sulphur trioxide. By effecting interaction of sulphur trioxide, sulphuric acid and urea in a liquid vehicle consisting predominantly of liquid sulphur trioxide such effective control of the reaction as not heretofore considered possible is obtained. Effective control of the temperature of the reaction mixture is obtained because the heat of the reaction is dissipated into a heat of vaporization of liquid sulphur trioxide. The reaction may therefore be maintained at a uniform temperature and the speed and velocity of the reaction accordingly determined. This close temperature control, coupled with a favorable effect obtained by having an excess of sulphur trioxide during the reaction, makes it possible to produce a crude acid of high purity and yields.

The liquid sulphur trioxide serves a number of functions, for example, as a vehicle in which the reagents are dispersed or dissolved, as a heat transfer medium to control the temperature of the reaction, and as a reagent. An excess of sulphur trioxide also has been observed to have a beneficial effect upon the yield. By having a sufficient quantity of liquid sulphur trioxide in the reaction mixture to provide an easily fluid reaction mixture thruout, either by using sufficient sulphur trioxide in the beginning or by continually adding liquid sulphur trioxide, as, for example, by refluxing, as required to replace that evaporated, the reaction proceeds efficiently and without violence. Thus the invention provides highly efficient and economical methods for carrying out the reaction between urea, sulphur trioxide and sulphuric acid, and besides being efficient and economical is capable of producing directly without refining a product which under optimum conditions is of higher purity and is obtained in higher yield, that is, without purification steps, than in the prior art methods.

According to one form of the invention, urea is first dissolved in liquid sulphur trioxide and sulphuric acid then added in the proper quantity and with the application of heat as required to effect formation of sulphamic acid. It appears that there are two distinct reactions involved; first, the reaction of sulphur trioxide and urea to form urea monosulphonic acid, and, second, the reaction of the urea monosulphonic acid with sulphuric acid to form sulphamic acid. It also appears that by thus segregating the two reactions better control of the process is obtained. By first adding the urea to liquid sulphur trioxide it is easier to control those factors, such as excessively high temperature and exposure of urea to gaseous sulphur trioxide, which have been observed to contribute to the formation of by-products such as ammonium acid sulphate. This control is more easily effected in the absence of the sulphuric acid.

While it is thus desirable to first introduce urea into the liquid sulphur trioxide and thereafter to introduce the sulphuric acid it is not necessary that this procedure be followed in order to segregate the two reactions. When sulphuric acid is added to a solution of urea in liquid sulphur trioxide there appears to be little, if any, reaction until the temperature has been raised to about 75° C., whereupon evolution of carbon dioxide commences at a fairly rapid rate. Thus as long as the temperature is maintained sufficiently low to prevent the sulphamic acid-forming reaction, there may be sulphuric acid present during the introduction of the urea. As the solution rate of urea in liquid sulphur trioxide is about three times higher if sulphuric acid is present, good heat exchange and temperature control is required. Thus any sulphuric acid may first be dissolved in the liquid sulphur trioxide.

The urea and liquid sulphur trioxide are brought together with vigorous agitation to insure that all surfaces of the urea are continuously bathed with liquid sulphur trioxide. Simultaneously cooling is effected either by refluxing the liquid sulphur trioxide or by providing suitable heat exchange. The reaction of urea with sulphur trioxide when not properly controlled is extremely rapid and violent and goes with a large evolution of heat. Under the controlled conditions of the process the product is probably urea monosulphonic acid which readily converts to sulphamic acid on further reaction with sulphuric acid. Under less favorable conditions of reaction such as in contacting urea with vapor phase sulphur trioxide or with liquid sulphur trioxide in an amount insufficient to produce a fluent reaction medium, excessive temperatures may not be avoided and under such conditions a substantial amount of by-product ammonium acid sulphate may be present in the final product so that low yields of sulphamic acid are obtained. When urea is exposed to vapor phase sulphur trioxide or insufficient liquid sulphur trioxide, it undergoes fusion whereupon the reaction becomes uncontrollable and proceeds with violence. On the other hand, when urea is contacted with a large excess of liquid sulphur trioxide with sufficient agitation to wet all the surfaces of the urea continuously with liquid sulphur trioxide and excess local temperatures are avoided thru dissipation of heat by boiling off sulphur trioxide or by circulating the said sulphur trioxide over cooling means, the reaction goes predominantly to urea monosulphonic acid which can subsequently be converted to sulphamic acid of high purity in very high yield.

The invention may be more fully understood by reference to the following examples in which the parts are by weight unless otherwise specified:

*Example 1*

Sixty parts of urea in the form of cylindrical pellets, ⅜" x ⅜", were charged at one time into 720 parts of liquid sulphur trioxide and vigorously agitated under reflux at atmospheric pressure. The reaction proceeded at about the reflux temperature (47–52° C.) until all of the urea particles had dissolved (about 3.5 hours). No fuming above the bath or other evidence of excessive local temperatures were observed. Ninety-three parts of 98.9% sulphuric acid were then added and the mix allowed to reflux for fifteen minutes. The excess sulphur trioxide was then distilled off. During this distillation the temperature gradually rose and when it reached a temperature of 75° C. evolution of carbon dioxide became significant, indicating rapid formation of sulphamic acid in the reaction mixture. One-hundred ninety-eight parts of crude sulphamic acid having the following analysis were thus obtained:

| | Per cent |
|---|---|
| Sulphamic acid | 96.05 |
| Ammonium acid sulphate | 0.32 |
| Sulphuric acid and sulphur trioxide calculated as sulphuric acid | 2.85 |
| | 99.22 |

This corresponds to a yield of 98.3% of $NH_2SO_3H$ based on the urea added.

While urea pellets were used in the example it will be understood that other forms such as crystal urea may be used. Whether crystals or pellets are used, however, it is desirable to keep the urea agglomerates, or pellets, which float on the surface of the liquid thoroly wetted with liquid sulphur trioxide by means of suitable agitation. If this is not done the reaction of the urea with the vapor phase sulphur trioxide above the bath raises the temperature of the exposed urea sufficiently to cause fusion of the urea, excessive violence of the reaction, and partial decomposition. Under these conditions a heavy white fume is observed in the vapor space above the bath, whereas in good reaction control this vapor space will be perfectly clear.

On addition of sulphuric acid to the solution of urea in liquid sulphur trioxide at the temperature noted in the example, little reaction as evidenced by the evolution of carbon dioxide was observed. It was only after the temperature of the mix rose to 75° C. during the evaporation of the sulphur trioxide that evolution of carbon dioxide became significant, thus indicating rapid formation of sulphamic acid. During the distillation the solution becomes viscous and has a strong tendency to foam. It is desirable, therefore, to bring the residue to dryness under reduced pressure or by adding the solution either before or after a partial evaporation of sulphur trioxide to a dry heel of sulphamic acid heated approximately to 100° C. while in a state of agitation.

While the advantages of my invention, particularly in the ease of controlling the reaction and in obtaining high yields and high purity of product, are realized to an unusual extent in processes in which sulphuric acid is reacted with a solution of ureau in liquid sulphur trioxide, still the invention in its broader aspects is not so limited and many of its advantages are realized by other procedures such as are illustrated in the following example.

*Example 2*

60 parts of urea pellets were added to a vigorously agitated liquid mixture containing 720 parts of liquid sulphur trioxide and 90 parts of 98.9% sulphuric acid under reflux at atmospheric pressure. All the urea had gone into solution in 65 minutes. The excess sulphur trioxide was then carefully distilled off to avoid excessive foaming as the residue became more viscous, and the residue brought to dryness under vacuum in an oven at 112° C. 195 parts of crude sulphamic acid having the following analysis was thus obtained.

| | Per cent |
|---|---|
| Sulphamic acid | 95.57 |
| Ammonium acid sulphate | 1.31 |
| Sulphuric acid and sulphur trioxide calculated as sulphuric acid | 2.63 |
| | 99.51 |

This corresponds to a yield of 96.2% of sulphamic acid based on the urea.

This example illustrates how urea may be added to a solution of sulphuric acid in liquid sulphur trioxide with results nearly as satisfactory as those obtained in Example 1. By effecting adequate control of the temperature during the addition of the urea by means of vigorous agitation, and reflux of the liquid sulphur trioxide at atmospheric pressure, the sulphuric acid appears to be essentially inert, except for its accelerating effect upon the rate of solution of the urea, and the reaction proceeds first with the formation of a solution of urea monosulphonic acid or like intermediate reaction product and then during the distillation, when the temperature becomes high enough, with the formation of sulphamic acid.

Since the rate at which the urea dissolves is much higher in the liquid sulphur trioxide when sulphuric acid is present, greater care and better agitation are necessary. In another run closely paralleling that of Example 2, in which sulphuric acid was added to the sulphur trioxide before the urea addition, considerable foaming occurred during the solution of the urea, such that the bath was covered with about a ½-inch foam layer. The standard glass paddle agitator did not provide sufficiently vigorous stirring to continuously or repeatedly submerge the urea pellets under these conditions. Some of the pellets floated on the foam and could not be stirred back into the liquid. These pellets reacted violently with the vapor phase sulphur trioxide with evolution of a white fume. The product as noted in the following analysis, was inferior.

|  | Per cent |
|---|---|
| Sulphamic acid | 85.14 |
| Ammonium acid sulphate | 8.56 |
| Sulphuric acid and sulphur trioxide calculated as sulphuric acid | 4.36 |
|  | 98.06 |

This foaming tendency may be minimized by using a somewhat greater excess of sulhpur trioxide or by holding temperature somewhat lower than the boiling point.

The proportions of the reagents may be varied widely but for optimum results the following should be observed. The theoretical proportions of urea, sulphur trioxide and sulphuric acid are one mole of each, the reaction proceeding according to the following equation:

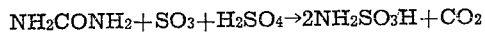
$NH_2CONH_2 + SO_3 + H_2SO_4 \rightarrow 2NH_2SO_3H + CO_2$

In figuring these proportions any water in the system or which might be picked up by the system during the reaction should be taken into account since water and sulphur trioxide combine in molecular proportions to give sulphuric acid. It is generally desirable to carry out the reaction with substantially one mole of sulphuric acid for each mole of urea, the sulphur trioxide being always substantially in excess by virtue of the reaction being carried out in a liquid vehicle consisting predominantly of liquid sulphur trioxide.

The amount of liquid sulphur trioxide may be varied widely according to the manner in which the process is carried out. Sufficient liquid sulphur trioxide should be present thruout the reaction to keep the reaction mixture as a fluent liquid thruout. This condition is maintained most conveniently and economically by carrying out the reaction under reflux. A suitable quantity of liquid sulphur trioxide is between about 6 to about 15 parts by weight for each part by weight of urea. A lesser amount may be used but it has been observed that the reaction becomes more difficult to control as the reaction mixture becomes viscous and of consequence it is desirable that sufficient liquid sulphur trioxide always be present to maintain the reaction mixture as a fluent liquid thruout the reaction. Any greater amount may be used but will not ordinarily be desirable in view of the recovery problem.

In the proper proportions the sulphur trioxide acts as a liquid vehicle in which the reagents are sufficiently dispersed that efficient and economical heat exchange may be obtained. Also, as previously noted, the excess of sulphur trioxide favorably influences the course of the reaction and materially contributes to the production of a product of high purity in high yield. Preferably the amount of liquid sulphur trioxide should be sufficient to provide a homogeneous solution thruout the reaction. It will generally be sufficient if the liquid sulphur trioxide constitutes at least about 70% of the reaction mixture, and under reflux or pressure it will not ordinarily be necessary or desirable to have the liquid sulphur trioxide constitute more than 85% of the reaction mixture.

The sulphuric acid may be added as monohydrate (100% sulphuric acid) or as aqueous sulphuric acid (less than 100% sulphuric acid), or as oleum (more than 100% sulphuric acid).

The temperature during the reaction may vary widely but will ordinarily be maintained at the boiling point of the reaction mixture which will ordinarily range from about 45 to 60° C. By carrying out reflux under reduced pressure or by effecting cooling by heat exchange with the liquid sulphur trioxide lower temperature may be obtained though temperatures below about 30° C. do not appear to be desirable. Higher temperatures also may be obtained by effecting reflux, or by cooling by heat exchange, under superatmospheric pressure. Exceptionally high temperatures, however, are known adversely to affect sulfamic acid and consequently should be avoided. Thus temperatures up to about 120° C. may be used. For best results the temperature should be maintained low enough during the introduction of urea to prevent the sulphamic acid-forming reaction which begins to take place at about 75° C. This is especially desirable where sulphuric acid is present in the reaction mixture during the addition of urea, in which case the temperature is most suitably maintained below 60° C. When the urea is added to liquid sulphur trioxide which does not contain sulphuric acid the temperature ordinarily should be kept below about 80° C. and at least should not be allowed to exceed this temperature for more than a short time.

In the operation of the processes of the invention the temperature increases from the boiling point of liquid sulphur trioxide as the reagents are introduced and as the liquid sulphur trioxide is distilled off. When the temperature reaches about 75° C. copious evolution of carbon dioxide begins, indicating rapid formation of sulphamic acid. Alternatively the process may be carried out under superatmospheric pressure sufficient to raise the temperature to the level required for the release of carbon dioxide at a practical rate without substantial evaporation of sulphur trioxide. In this manner the carbon dioxide can be driven off while the reaction mixture is still highly fluent because of the liquid sulphur trioxide present.

The tendency of the reaction mixture to foam during the evaporation of the sulphur trioxide may continue even after the evolution of carbon dioxide has ceased. To overcome this difficulty, it is desirable at least in the latter stages of the distillation of the sulphur trioxide, to effect the distillation while the reaction mixture is in a dispersed state. This may be effected mechanically as in the case of a spray drier or a flaking drum, or by dispersing the reaction mixture thruout a heel or recycled sulphamic acid. When the reaction mixture is dispersed as a film upon the surface of a solid as in the case of a flaking drum or as in the case of admixture with a diluent such as a heel of recycled sulphamic acid, or when it is dispersed as discrete particles as in the spray drying, great surface is provided for the evolution of the gas and of consequence the evaporation may be effected easily and effectively without the complications described.

The manner in which the reagents are brought together may be varied widely, though, for reasons already set out, it is preferred that the urea first be dissolved in the liquid sulphur trioxide before it is brought into contact with sulphuric acid. Alternatively the sulphuric acid may be combined with the liquid sulphur trioxide. Another variation is that the urea may be diluted with recycled sulphamic acid. In this manner the urea may be added to the sulphur trioxide as a liquid since in the proper proportions a mixture of urea and sulphamic acid has quite a low melting point. Thus a mixture of 3 parts of urea and 1 part of sulphamic acid are molten at about 65–70° C.

I claim:

1. In the manufacture of sulphamic acid the steps of bringing about the reaction between substantially equimolecular proportions of urea and sulphuric acid and liquid sulphur trioxide under such conditions and in the presence of such excessive amounts of said liquid sulphur trioxide as to provide a liquid vehicle for the reaction while effecting agitation and cooling sufficient to inhibit fuming or evolution of carbon dioxide and thereafter heating to cause evolution of carbon dioxide.

2. In the manufacture of sulphamic acid the steps of bringing about the reaction between substantially equimolecular proportions of urea and sulphuric acid, and liquid sulphur trioxide under such conditions and in the presence of such excessive amounts of said liquid sulphur trioxide as to provide a liquid vehicle for the reaction while effecting agitation and cooling sufficient to maintain a temperature below about 60° C. and thereafter heating to a temperature between about 75 and 120° C.

3. In the manufacture of sulphanic acid the steps of bringing together urea and sulphur trioxide in the proportions of at least about 6 parts of sulphur trioxide for each part of urea and effecting the reaction under such conditions that there is no substantial loss of sulphur trioxide from the reaction vessel during said reaction while agitating and cooling sufficient to inhibit fuming or evolution of carbon dioxide and thereafter heating in the presence of sulphuric acid to bring about evolution of carbon dioxide.

4. In the manufacture of sulphamic acid the steps of bringing together urea and liquid sulphur trioxide in the proportions of at least 6 parts of liquid sulphur trioxide for each part of urea and effecting the reaction under such conditions that there is no substantial loss of sulphur trioxide from the reaction vessel during said reaction while agitating and cooling sufficient to maintain a temperature below about 80° C., thereafter introducing sulphuric acid in the proportion of one mole of sulphuric acid for each mole of urea and thereafter heating to a temperature between about 75° C. and about 120° C.

5. In the manufacture of sulphamic acid the steps of reacting urea with an excess of liquid sulphur trioxide sufficient to give a liquid reaction medium at a temperature not in excess of about 80° C. while refluxing to return boiled out sulphur trioxide to assist in dissipating heat of the reaction and to maintain said reaction medium in a liquid state and adding a stoichiometric quantity of sulphuric acid with heating to convert the initially formed product to suphamic acid.

6. In the manufacture of sulphamic acid the steps of bringing together substantially equimolecular proportions of urea, sulphuric acid and at least about 6 parts of liquid sulphur trioxide for each part of urea and effecting the reaction under such conditions that there is no substantial loss of sulphur trioxide from the reaction vessel during said reaction while agitating and cooling sufficient to inhibit formation of sulphamic acid and thereafter heating to bring about the formation of sulphamic acid.

7. In the manufacture of sulphamic acid the steps of separately dissolving urea and sulphuric acid in substantially equimolecular proportions in liquid sulphur trioxide and bringing about a reaction under such conditions and in the presence of such excessive amounts of said liquid sulphur trioxide as to provide a liquid vehicle for the reaction while effecting agitation and cooling as required to prevent formation of sulphamic acid and thereafter heating to bring about formation of sulphamic acid.

8. In the manufacture of sulphamic acid from urea, sulphuric acid and sulphur trioxide, the steps comprising reacting sulphur trioxide and urea in such an excess of liquid sulphur trioxide as to maintain a liquid reaction medium, and thereafter reacting the sulphur trioxide-urea reaction product thus produced with sulphuric acid.

9. In the manufacture of sulphamic acid from urea, sulphuric acid and sulphur trioxide, the steps comprising reacting sulphur trioxide and urea at a temperature below about 80° C. in such an excess of liquid sulphur trioxide as to maintain a liquid reaction medium, and thereafter reacting the sulphur trioxide-urea reaction product thus produced with sulphuric acid at a temperature between about 75° C. and 120° C.

10. In the manufacture of sulphamic acid from urea, sulphuric acid and sulphur trioxide, the steps comprising reacting sulphur trioxide and urea in the presence of sulphuric acid at a temperature below about 60° C. in such an excess of liquid sulphur trioxide as to maintain a liquid reaction medium, and thereafter heating to react the sulphur trioxide-urea reaction product thus produced with said sulphuric acid at a temperature between about 75° C. and 120° C.

11. In the manufacture of sulphamic acid, the steps of bringing about a reaction at essentially atmospheric pressure between substantially equimolecular proportions of urea and sulphuric acid and liquid sulphur trioxide present in sufficient amount to provide a liquid vehicle for the reaction while refluxing to return boiled out sulphur trioxide to assist in dissipating heat of the reaction and to maintain the reaction medium in a liquid state and while effecting agitation and cooling sufficient to inhibit fuming or evolution of carbon dioxide and thereafter heating to cause evolution of carbon dioxide.

12. In the manufacture of sulphamic acid, the steps of bringing about a reaction at essentially atmospheric pressure between substantially equimolecular proportions of urea and sulphuric acid and liquid sulphur trioxide present in sufficient amount to provide a liquid vehicle for the reaction while refluxing to return boiled out sulphur trioxide to assist in dissipating heat of the reaction and to maintain the reaction medium in a liquid state and while effecting agitation and cooling sufficient to maintain a temperature below about 60° C., and thereafter heating to a temperature between about 75° C. and 120° C.

13. In the manufacture of sulphamic acid, the steps of bringing together urea and sulphur trioxide in the proportions of at least about 6 parts of sulphur trioxide for each part of urea and effecting reaction at essentially atmospheric pressure while refluxing to return boiled out sulphur trioxide to assist in dissipating heat of the reaction and to maintain the reaction medium in a liquid state and while agitating and cooling sufficient to inhibit fuming or evolution of carbon dioxide, and thereafter heating in the presence of sulphuric acid to bring about evolution of carbon dioxide.

14. In the manufacture of sulphamic acid, the steps of bringing together urea and sulphur trioxide in the proportions of at least about 6 parts of sulphur trioxide for each part of urea and effecting reaction at essentially atmospheric pressure while refluxing to return boiled out sulphur trioxide to assist in dissipating heat of the reaction and to maintain the reaction medium in a liquid state and while agitating and cooling to maintain a temperature below about 60° C., thereafter introducing sulphuric acid in the proportion of one mole of sulphuric acid for each mole of urea, and thereafter heating to a temperature between about 75° C. and 120° C.

15. In the manufacture of sulphamic acid, the steps of separately dissolving urea and sulphuric acid in substantially equimolecular proportions in liquid sulphur trioxide in sufficient excess to provide a liquid vehicle for the reaction and bringing about reaction at essentially atmospheric pressure while refluxing to return boiled out sulphur trioxide to assist in dissipating heat of the reaction and to maintain the reaction medium in a liquid state and while effecting agitation and cooling sufficient to maintain a temperature below about 60° C., thereafter introducing sulphuric acid in the proportion of one mole of sulphuric acid for each mole of urea, and thereafter heating to a temperature between 75° C. and 120° C.

ERNEST J. TAUCH.